Patented Aug. 28, 1934

1,971,618

UNITED STATES PATENT OFFICE 1,971,618

FRICTION FACING

Raymond J. Norton, Washington, D. C., assignor to Bendix Brake Company, South Bend, Ind., a corporation of Illinois No Drawing. Application December 11, 1930, Serial No. 501,748

2 Claims. (Cl. 91—68)

This invention relates to improved friction facings for use particularly in brake and clutch apparatus.

One general disadvantage of friction facings, and particularly those of brake apparatus, is the fact that no adequate provision is made for the dissipation of generated frictional heats. The ordinary brake apparatus now employed on automotive vehicles comprises a non-rotating part upon which is attached a friction facing which cooperates with a rotating drum. The non-rotating part is enclosed within the drum and substantially sealed off by means of a backing plate, hence as the brake is applied the generated heats of friction build up very rapidly. This is particularly disadvantageous when friction facings comprising a woven or felted asbestos bonded with a synthetic resin is employed. These resins carbonize at relatively low temperature, hence if the generated frictional heats reach a very high temperature they tend to carbonize or disintegrate.

Heretofore but little attention has been paid to the cooling of these friction facings. Any attempts to effect cooling of the brake apparatus have been confined largely to cooling of the drum, as by providing heat radiation fins on the drum, or by forming the drum with an exterior radiating surface of high heat emissivity.

An object of the present invention is to provide an automatically cooled friction facing.

Another object is to provide in effect a refrigerated friction facing.

Another object is to provide a friction facing from which the generated heats of friction are withdrawn by utilizing a plurality of thermal factors.

Yet another object is to provide a friction facing from which the heat is abstracted by means of conduction and direct absorption.

A further object is to provide an improved friction facing of the synthetic resin bonded type.

With these and other equally important objects in view the invention in its essence comprehends the concept of incorporating in the friction facing materials which have a high heat of phase transformation so that the generated frictional heats are absorbed in the transformation of the substances from one phase to another, as for example from the solid to the liquid phase or from the liquid to the vapor phase, or any combination of these. In its more complete embodiment the invention also comprehends the provision of metallic members which form thermal conductors extending from the heat generated surface through the friction material to a metallic member so as in effect to provide a path of high thermal conductivity from the surface at which the heats are generated to a metallic substance from which the heats may be dissipated by radiation and/or convection.

With the given concept in mind, it will be appreciated that a great variety of specifically different frictional materials may be made up. All of these may be made to subserve the fundamental functions hereinbefore set forth.

It is recognized as old to incorporate certain metallic materials in the band which tend to smooth out the braking action. A typical example of these materials is metal lead. This has been used in the form of wires. The rationale of this use probably is that due to its relatively low melting point the lead tends to fuse or melt as the braking temperatures rise and provides a type of lubrication between the friction facing and the drum. The use of metals such as lead is to be carefully distinguished from the use of other metals to be hereinafter described, to subserve the purposes of the present invention.

One method of effectuating the principles of the present invention is to make up a friction facing either of the woven or felted type bonded with a heavy asphaltic residue or a synthetic resin, and to incorporate in the friction material, at any desired stage of manufacture, a relatively large amount of a metal which has a high latent heat of phase transformation. Examples of such metals are bismuth and cadmium. In choosing these metals another advantageous function will be subserved, as is shown in the following table:

|  | M.P. | Heat G-cal. |
|---|---|---|
| Bismuth | 268° C. | 12.64 |
| Cadmium | 320° C. | 13.64 |

From inspection of the above table it will be seen that both bismuth and cadmium have a melting point within that range of temperatures which may obtain in braking action. It is to be noted also that the latent heat of fusion of these two metals is relatively high. To compare the effect of these with metals which have heretofore been used in friction facings, it is to be observed that although lead has a melting point of 327° C. and is therefore comparable in the lubricating function to bismuth and cadmium, it has a latent heat of fusion of only 5.86 G-cal. It will thus be appreciated that by incorporating sufficiently large amounts of finely divided bismuth and cadmium, preferably in pellet form, in the brake band, when the braking temperatures reach the melting point of these materials two results will obtain. In passing from a solid to a liquid, at their melting point bismuth and cadmium will take up 12.64 and 13.64 cal. per gram respectively. By increasing the amount of finely divided metal an increased absorption of heat takes place. Since the heat is generated right in the friction facing, these metals in fusing or melting will absorb this heat directly at the surface. By increasing the amount of the metals the quantity of heat absorbed will increase in direct proportion to its latent heat of fusion.

After the metals have fused and have absorbed the heat necessary to effect fusion, those in liquid state then serve as a lubricating medium for the brake band and to the extent of the lubricating function reduce the coefficient of friction between the friction facing and the drum, and to this extent diminish further generation of heat, because the entire brake is essentially a machine which transforms mechanical energy into heat energy.

It will be appreciated, of course, that this absorption of heat by the utilization of the heat of phase transformation may be made so-to-speak continuous over an increasing range of temperature. For example, metallic zinc may be incorporated in the friction facing together with metallic bismuth and/or cadmium. Zinc melts at 419° C. and has a latent heat of 28.13 cal. per gram. If a brake band is made up with these three metals it will be immediately perceived that as the temperatures rise from 268 up to 419° C. bismuth, cadmium and zinc will progressively fuse, and during this fusion they will take up a quantum of heat, the amount of which depends upon the latent heat of fusion and the quantity which is within the zone of heat action. Therefore, by the proper choice of the type of metal and the amounts of these metals a graduated and continuously effective refrigerating or heat absorption may be obtained.

Now it will be observed that this effect is cyclic and regenerative. When the temperatures rise due to the transformation of the mechanical energy into heat energy, materials in the band will fuse, absorb heat and lubricate the friction facing. When the brake application is discontinued the friction facing will cool down in a normal manner and the fused metals will pass from the liquid to the solid phase and in effect be ready for a subsequent application with potential refrigerating or cooling action.

It is to be understood that the invention is by no means limited to the use of pure or impure metals. The described functions may be subserved, even to a greater degree, by the proper choice of other materials such as organic and inorganic substances. To illustrate this a specific example will be given. Potassium nitrate has a melting point of 333.5° C. This temperature is well within the range which is encountered in normal braking operations. This material absorbs 48.9 cal. for every gram that is transformed from the solid to the liquid phase. Considering only the refrigerating effect, this material is four times as effective as bismuth. Another substance which may be mentioned is sodium nitrate. This salt melts at a lower temperature than the corresponding potassium salt having a 305.8 melting point. Its latent heat of fusion is quite high, being 64.7 cal. per gram. It will be seen that relatively small amounts of these materials will absorb a considerable amount of heat and like the metals provide, at the melting point temperatures, a liquid medium which serves to reduce the coefficient of friction by serving in effect as a lubricant.

No attempt is made to exhaustively discuss all of the possible materials which are available. It will be understood that a great number of materials may be used since the present invention involves the physical principle of utilizing the heat of phase transformation for the purpose of cooling the band. Instead of the separate materials, obviously mixtures of these may be employed.

The materials which have been mentioned heretofore are in fact regenerative in character. However the invention is not necessarily limited to these. A refrigerating effect may be obtained by utilizing the latent heat of vaporization of materials. In this event, while high cooling or refrigerating effects may be obtained, this refrigerating action is not regenerative as in the case of the utilization of the latent heat of fusion, because the vaporized material, after once having been transformed to the vapor phase, will be evolved or distilled out of the friction material and hence lost.

The fundamental purpose of the present improvement is, as hereinbefore stated, to cool down the friction facing. Now this may be made more effective by utilizing other and supplementary means. The cooling effect hereinbefore described was obtained by absorbing generated heat in materials so as to cause them to fuse. The generated heat of friction may likewise be dissipated from the friction material by conduction. Therefore the present invention comprehends also the provision, together with the included solids, metallic wires or inserts which extend from adjacent the frictional engaging surface to the metal member, such as a brake shoe, upon which the friction facing is mounted. From the thermal standpoint, the most effective metals would be those having a high coefficient of thermal conductivity, such as copper. However, obviously other metals may be employed. With such a structure the generated heats of friction are disposed of in two ways, first by absorbing in the fusible material and second by conduction, through the termal conductive paths back to the metal backing plate and thence by radiation and convection from the exposed surfaces of the metal member.

The quantum of heat generated in a given time is in part a function of the coefficient of friction existing between the rotating and the non-rotating member. As pointed out hereinbefore, this generated frictional heat may be diminished by diminishing the brake action, as by lowering the coefficient of friction. The fusible metals of the solids employed for cooling the band subserve a lubricating function and to this extent further diminish the generated frictional heats, or more strictly maintain these at a low value. This lubricating function, if desired, may be increased by other means as by incorporating permanent lubricants either of an oleaginous or non-oleaginous material in the band. Hence the invention also is intended to include a friction facing made up of woven or felted asbestos or similar material bonded with a synthetic resin in which is incorporated a substance having a high latent heat phase of transformation. There are a number of materials which serve to lubricate the friction facings and thereby diminish its coefficient of friction. Such substances may be graphite, insoluble soaps, lubricating oils, etc.

It will now be observed that by embodying the principles hereindescribed an improved friction material may be provided. This material will in effect be a refrigerated friction material, being, within temperature ranges determined by the material employed, automatically cooled. Furthermore, as described, by the proper choice of material this cooling or refrigerating effect may not only be made automatic but also cyclic or regenerative. The cooling effect obtained by utilizing the latent heat of phase transformation is supplemented and increased by utilizing the principles of conduction from the heat generating zone and dissipation from a heat radiating and heat convective surface. Therefore, while specific embodiments of the invention have been described, it is to be understood that these are given largely by way of example and only as typical methods of effectuating the principles herein involved.

I claim:

1. A friction facing having incorporated therein a plurality of inorganic salts each having a relatively low melting point and a relatively high latent heat of fusion.

2. A friction facing having incorporated therein a metal and a metal salt having relatively low melting points and relatively high latent heats of fusion.

RAYMOND J. NORTON.